(12) United States Patent
Melnikov et al.

(10) Patent No.: US 8,997,049 B1
(45) Date of Patent: Mar. 31, 2015

(54) METHOD AND SYSTEM FOR DEBUGGING OF COMPILED CODE USING AN INTERPRETER

(75) Inventors: Rodion Melnikov, Modlin (IL); Meir Ovadia, Zur-Igal (IL)

(73) Assignee: Cadence Design Systems, Inc., San Jose, CA (US)

( * ) Notice: Subject to any disclaimer, the term of this patent is extended or adjusted under 35 U.S.C. 154(b) by 268 days.

(21) Appl. No.: 12/784,857

(22) Filed: May 21, 2010

(51) Int. Cl.
*G06F 9/44* (2006.01)
*G06F 9/45* (2006.01)

(52) U.S. Cl.
CPC .................................. *G06F 8/43* (2013.01)
USPC .......................... 717/124; 717/129; 717/139

(58) Field of Classification Search
CPC ......... G06F 8/34; G06F 8/10; G06F 11/3688; G06F 11/3466; G06F 11/3409; G06F 11/3636; G06F 11/362; G06F 11/3664; G06F 9/45508; G06F 9/45504; G06F 8/443; G06F 9/45516
See application file for complete search history.

(56) References Cited

U.S. PATENT DOCUMENTS

| | | | | |
|---|---|---|---|---|
| 5,764,989 | A * | 6/1998 | Gustafsson et al. .......... | 717/129 |
| 6,009,256 | A | 12/1999 | Tseng et al. | |
| 6,249,907 | B1 | 6/2001 | Carter et al. | |
| 6,256,752 | B1 * | 7/2001 | Blandy et al. ................. | 714/38.1 |
| 6,353,923 | B1 * | 3/2002 | Bogle et al. ................... | 717/128 |
| 6,530,075 | B1 | 3/2003 | Beadle et al. | |
| 6,594,783 | B1 * | 7/2003 | Dollin et al. ................ | 714/38.14 |
| 6,910,206 | B1 * | 6/2005 | Nevill ............................ | 717/139 |
| 7,134,119 | B2 * | 11/2006 | Nevill ............................ | 717/139 |
| 7,203,926 | B2 * | 4/2007 | Bogle et al. ................... | 717/124 |
| 7,296,257 | B1 * | 11/2007 | Dibble et al. ................. | 717/127 |
| 7,464,373 | B1 * | 12/2008 | Yunt et al. ..................... | 717/125 |
| 7,617,084 | B1 * | 11/2009 | Koslow et al. ................ | 717/124 |
| 7,694,278 | B2 * | 4/2010 | Pasumansky et al. ........ | 717/129 |
| 7,774,172 | B1 * | 8/2010 | Yunt et al. ..................... | 717/129 |
| 7,984,304 | B1 * | 7/2011 | Waldspurger et al. ........ | 717/124 |
| 8,131,523 | B1 * | 3/2012 | Yunt et al. ........................ | 703/2 |
| 8,196,107 | B2 * | 6/2012 | Stall et al. ..................... | 717/124 |
| 8,271,958 | B2 * | 9/2012 | Stall et al. ..................... | 717/124 |
| 8,370,816 | B2 * | 2/2013 | Farchi et al. .................. | 717/129 |
| 8,572,578 | B2 * | 10/2013 | Stall .............................. | 717/129 |
| 8,578,339 | B2 * | 11/2013 | Day et al. ...................... | 717/128 |
| 8,607,199 | B2 * | 12/2013 | Kim et al. ..................... | 717/124 |

(Continued)

OTHER PUBLICATIONS

Victor Berman, "An update on IEEE P1647: The E system verification language", 2005 IEEE, pp. 484-486; <http://ieeexplore.ieee.org/stamp/stamp.jsp?arnumber=01511984>.*

(Continued)

*Primary Examiner* — Thuy Dao
*Assistant Examiner* — Ben C Wang
(74) *Attorney, Agent, or Firm* — Vista IP Law Group, LLP

(57) ABSTRACT

A system, method, and computer program product is disclosed that for debugging errors in software code. According to some approaches, techniques are provided for performing on-the-fly switching from compiled to interpretive debugging for a software program. The test starts with compiled code, and when it needs to stop for debugging, the debugging occurs in interpretive mode. Once debugging has concluded, the execution can switch back to compiled mode. In this way, the debugging activities can achieve the speed and efficiency of using compiled optimized executables, while still being able to allow debugging without performing any recompilations.

21 Claims, 10 Drawing Sheets

(56) References Cited

U.S. PATENT DOCUMENTS

| | | | |
|---|---|---|---|
| 8,677,329 B2* | 3/2014 | Beretta et al. | 717/139 |
| 8,745,597 B2* | 6/2014 | Kandasamy et al. | 717/130 |
| 8,776,024 B2* | 7/2014 | Cabillic et al. | 717/124 |
| 8,826,244 B2* | 9/2014 | Kandasamy et al. | 717/124 |
| 2001/0005852 A1* | 6/2001 | Bogle et al. | 709/102 |
| 2002/0019976 A1 | 2/2002 | Patel et al. | |
| 2002/0073375 A1* | 6/2002 | Hollander | 714/739 |
| 2002/0104077 A1* | 8/2002 | Charnell et al. | 717/162 |
| 2002/0108103 A1* | 8/2002 | Nevill | 717/139 |
| 2002/0108107 A1* | 8/2002 | Darnell et al. | 717/153 |
| 2002/0112227 A1* | 8/2002 | Kramskoy et al. | 717/139 |
| 2004/0015863 A1* | 1/2004 | McBrearty et al. | 717/124 |
| 2004/0210872 A1* | 10/2004 | Dorr et al. | 717/124 |
| 2004/0221272 A1 | 11/2004 | Wu et al. | |
| 2006/0020921 A1* | 1/2006 | Pasumansky et al. | 717/124 |
| 2006/0064676 A1* | 3/2006 | Chavan | 717/124 |
| 2006/0164269 A1* | 7/2006 | Trimbell et al. | 341/106 |
| 2006/0253508 A1* | 11/2006 | Colton et al. | 707/206 |
| 2007/0157174 A1* | 7/2007 | Gebhardt et al. | 717/124 |
| 2007/0250819 A1* | 10/2007 | Fjeldstad et al. | 717/129 |
| 2008/0066059 A1* | 3/2008 | Pugh et al. | 717/125 |
| 2008/0263528 A1* | 10/2008 | Moore et al. | 717/139 |
| 2008/0276226 A1* | 11/2008 | Farchi et al. | 717/129 |
| 2009/0158257 A1* | 6/2009 | Xu et al. | 717/129 |
| 2009/0172632 A1* | 7/2009 | Kashai et al. | 717/104 |
| 2009/0254801 A1* | 10/2009 | Pressman et al. | 715/205 |
| 2009/0319999 A1* | 12/2009 | Stall et al. | 717/128 |
| 2010/0037213 A1* | 2/2010 | Meijer et al. | 717/144 |
| 2010/0146377 A1 | 6/2010 | Simonyi | |
| 2010/0162212 A1* | 6/2010 | Stall et al. | 717/124 |
| 2010/0192134 A1* | 7/2010 | Arkhipov et al. | 717/129 |
| 2010/0313189 A1* | 12/2010 | Beretta et al. | 717/148 |
| 2011/0078651 A1* | 3/2011 | Ovadia et al. | 717/105 |
| 2011/0126176 A1* | 5/2011 | Kandasamy et al. | 717/130 |
| 2011/0265066 A1* | 10/2011 | Fee et al. | 717/139 |
| 2011/0296377 A1* | 12/2011 | Morozov et al. | 717/129 |
| 2011/0307872 A1* | 12/2011 | Stall | 717/129 |
| 2012/0047486 A1* | 2/2012 | Ashish et al. | 717/129 |
| 2012/0167052 A1* | 6/2012 | Fjeldstad et al. | 717/125 |
| 2012/0198424 A1* | 8/2012 | Kandasamy et al. | 717/130 |
| 2012/0304154 A1* | 11/2012 | Cabillic et al. | 717/124 |
| 2012/0331449 A1* | 12/2012 | Farchi et al. | 717/129 |
| 2014/0033183 A1* | 1/2014 | Brown | 717/124 |
| 2014/0282417 A1* | 9/2014 | Paveza et al. | 717/124 |

OTHER PUBLICATIONS

Stephen A. Edwards, "Design and Verification Languages", Nov. 2004, Columbia Univerisyt, New York, New York, pp. 1-18; <http://www.cs.columbia.edu/techreports/cucs-046-04.pdf>.*

Hollander et al., "The e Language: A Fresh Separation of Concerns", 2001 IEEE, pp. 41-50; <http://ieeexplore.ieee.org/stamp/stamp.jsp?tp=&arnumber=911754>.*

Victor Berman, "IEEE P1647 E Language: Cadence Plans for Standardization and Integration in Incisive Verification Flow", Jun. 2005, Cadence Design Systems, pp. 1-2; <http://www.cadence.com/newsletters/incisiveplatform/ieee_p1647elanguage.pdf>.*

Cai et al., "Debugging a High Level Language via a Unified Interpreter and Compiler Runtime Environment", In proceedings of EACA'04, Universidad de Santander, Spain, Jul. 1-3, 2004, pp. 1-6; <http://www.csd.uwo.ca/~moreno//Publications/CDMW-EACA-04.ps>.*

Jinlong Cai, "Debugging a High Level Language via a Unified Interpreter and Compiler Runtime Environment", Aug. 2004, The University of Western Ontario, London, Ontario, Canada, pp. 1-84; <http://www.csd.uwo.ca/~moreno/Publications/JinlongCai-MSThesis-2004.pdf.gz>.*

Seaton et al., "Debugging at Full Speed", 2014 ACM, Dyla'14 Jun. 2014, Edinburgh, UK, pp. 1-13; <http://dl.acm.org/results.cfm?h=1&cfid=454254856&cftoken=51700954>.*

Hiser et al., "Techniques and Tools for Dynamic Optimization", Apr. 2006 IEEE, IPDPS 2006, pp. 1-8; <http://ieeexplore.ieee.org/stamp/stamp.jsp?tp=&arnumber=1639569>.*

Cai et al., "Debugging a High Level Language via a Unified Interpreter and Compiler Runtime Environment", ISSAC 2004, Jul. 2004, University of Cantabria, Santander, Spain, pp. 1-6; <www.sigsam.org/issac/2004/poster-abstracts/abstract06.pd>.*

Xtreme-II "VPA for Scalable Performance", 2004.

Non-Final Office Action dated Aug. 29, 2013 for U.S. Appl. No. 13/189,436.

"Methods, Part 1," URL:http://www.asic-world.com/specman/methods1.html#Introduction_to_Methods, Aug. 1, 2013.

"Methods, Part 2," URL:http://www.asic-world.com/specman/methods2.html, Aug. 1, 2013.

"Specman In One Day, Part I," URL:http://www.asic-world.com/specman/specman_one_day1.html#Introduction, Mar. 20, 2011.

"Specman In One Day, Part II," URL:http://www.asic-world.com/specman/specman_one_day2.html, Aug. 1, 2013.

"Specman In One Day, Part III," URL:http://www.asic-world.com/specman/specman_one_day3.html, Aug. 1, 2013.

"Specman In One Day, Part IV," URL:http://www.asic-world.com/specman/specman_one_day4.html, Aug. 1, 2013.

"Tips for HVL and HDL users with special emphasis on Specman-e, SystemVerilog and Questa" URL:http://www.specman-verification.com/?entry=entry091112-093154, Nov. 12, 2009.

Final Office Action dated Mar. 28, 2014 for U.S. Appl. No. 13/189,436.

Niklaus Wirth, "Compiler Construction" Nov. 2005.

Non-Final Office Action dated Sep. 16, 2014 for U.S. Appl. No. 13/189,436.

* cited by examiner

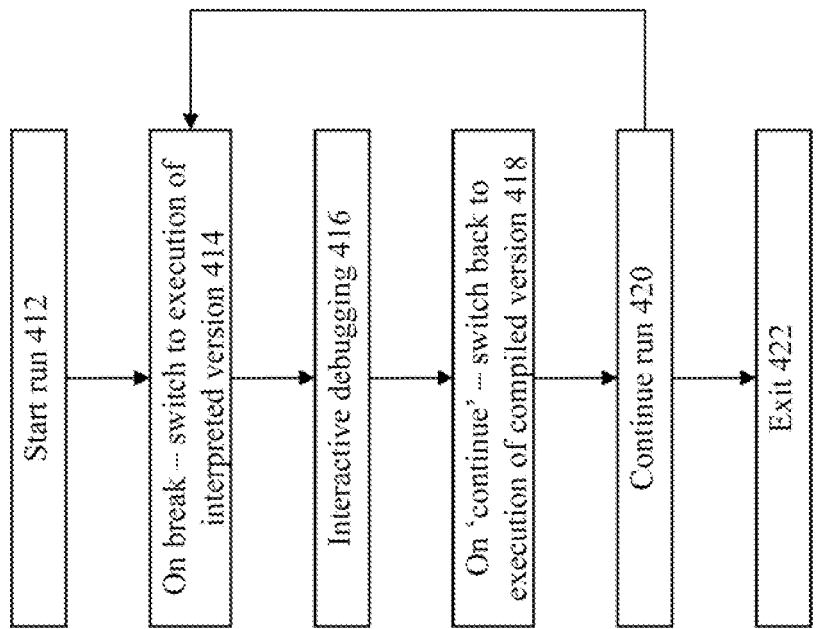

Figure 5A

Code (OO pseudo-language)

```
...
main() {
    A a = new;
    a.f_1();
    a.f_2();
    ...
    a.f_i-1();
    a.f_i();
    a.f_i+1();
    ...
    a.f_N();
}
...
```
502

```
...
class A {
    f_1() {...};
    f_2() {...};
    ...
    f_i-1() {...};
    f_i() {...};
    f_i+1() {...};
    ...
    f_N-1() {...};
    f_N() {...};
}
...
```
504

METHOD AND SYSTEM FOR DEBUGGING OF COMPILED CODE USING AN INTERPRETER

FIELD

The invention relates to the field of software code debugging

BACKGROUND

In the field of computer science, the term "software", "code", or "software code" often refers to a collection of statements and/or declarations written in a programming language to specify actions to be performed by a processing device. The processing device may be a general purpose computer or a dedicated device that is directed to a specific activity or function.

Like any other development process for a complex design, it is important to ensure that the process for developing software involves adequate testing and verification of the performance and functionality of the software. For software in particular, it is quite common during the development process to discover errors or "bugs" in the programming code. Many different types of errors may occur in a software program. For example, such errors can be syntax errors, semantic errors, or logic errors. The syntax error occurs when code is written in a manner not allowed by the rules of the language, and is the one type of error that can be easily caught by a compiler or interpreter.

A semantic error occurs when the syntax of the code is correct, but the semantics or meaning is not what was intended. A logic error occurs when the algorithmic flow of the software does not perform or produce a result that is intended, even if the semantics or syntax of the coding is correct. Because the semantic and logic errors can occur even if the coding obeys the language (syntax) rules, semantic and logic errors cannot typically be identified by the compiler or interpreter. Therefore, a software developer will often need to engage in debugging activities to address errors that are semantic or logic in nature.

The debugging activity is typically performed to allow the programmer or test engineer to observe the run-time behavior of the software program and to determine the location, cause, environment, or effect of the errors. With the debugging process or using a debugging tool, one can examine the content of variables or memory, insert stopping points, and/or step through the execution of the program. Once the cause of the error is identified, the developer can then modify the code to correct the problem.

When an error is encountered in software code, there are two common approaches that are often taken to debug the: (a) the recompilation approach and (b) the interpreter approach.

In the recompilation approach, the erroneous software program is recompiled for debugging purposes, by introducing debugging information into the compiled code. Since, in the interests of maximal time and execution efficiency, the original executable from which the error was discovered is usually formed as compiled optimized executables that do not include debug information, the debug information needs to be added to accomplish the debugging goals of the programmer. This approach, however, is associated with some significant performance problems. First, this approach requires the time and expense of performing a recompilation of the software. In addition, the recompilation in debugging mode typically precludes compilation optimizations from being used in the recompiled code. This means that the recompiled code in debugging mode will execute slower and/or less efficiently than the original compiled code that does include the optimizations.

In the interpreter approach, an interpreter is used to execute the software program. The interpreter is a program that can execute source code directly without compilation, or can use an intermediate representation of the source code for execution purposes. In many cases, the interpreter allows the software to be executed interactively. The main advantage of the interpreter approach over the recompilation approach is that the interpreter approach avoids the time and expense of having to recompile the software code. The disadvantage of this approach is that software execution using an interpreter is usually much, much slower than software execution of compiled software.

Therefore, there is a need for an improved approach for debugging software which can retain the best benefits of the recompilation and interpreter approaches, but without the corresponding drawbacks.

SUMMARY

The present invention provides an improved approach for debugging errors in software code. According to some embodiments of the invention, techniques are provided for performing on-the-fly switching from compiled to interpretive debugging for a software program. The test starts with compiled code, and when it needs to stop for debugging, the debugging occurs in interpretive mode. Once debugging has concluded, the execution can switch back to compiled mode. In this way, the debugging activities can achieve the speed and efficiency of using compiled optimized executables, while still being able to allow debugging without performing any recompilations.

Further details of aspects, objects, and advantages of the invention are described below in the detailed description, drawings, and claims. Both the foregoing general description and the following detailed description are exemplary and explanatory, and are not intended to be limiting as to the scope of the invention.

BRIEF DESCRIPTION OF THE DRAWINGS

FIG. 4B shows a flow of a process for debugging using both compiled and interpreted modes.

FIG. 5A-B provides an illustrative example for an embodiment of the invention.

DETAILED DESCRIPTION

The present invention provides an improved approach for debugging errors in software code. According to some embodiments of the invention, techniques are provided for performing on-the-fly switching from compiled to interpretive debugging for a software program. The test starts with compiled code, and when it needs to stop for debugging, the debugging occurs in interpretive mode. Once debugging has concluded, the execution can switch back to compiled mode. In this way, the debugging activities can achieve the speed and efficiency of using compiled optimized executables, while still being able to allow debugging without performing any recompilations.

Figure 1:
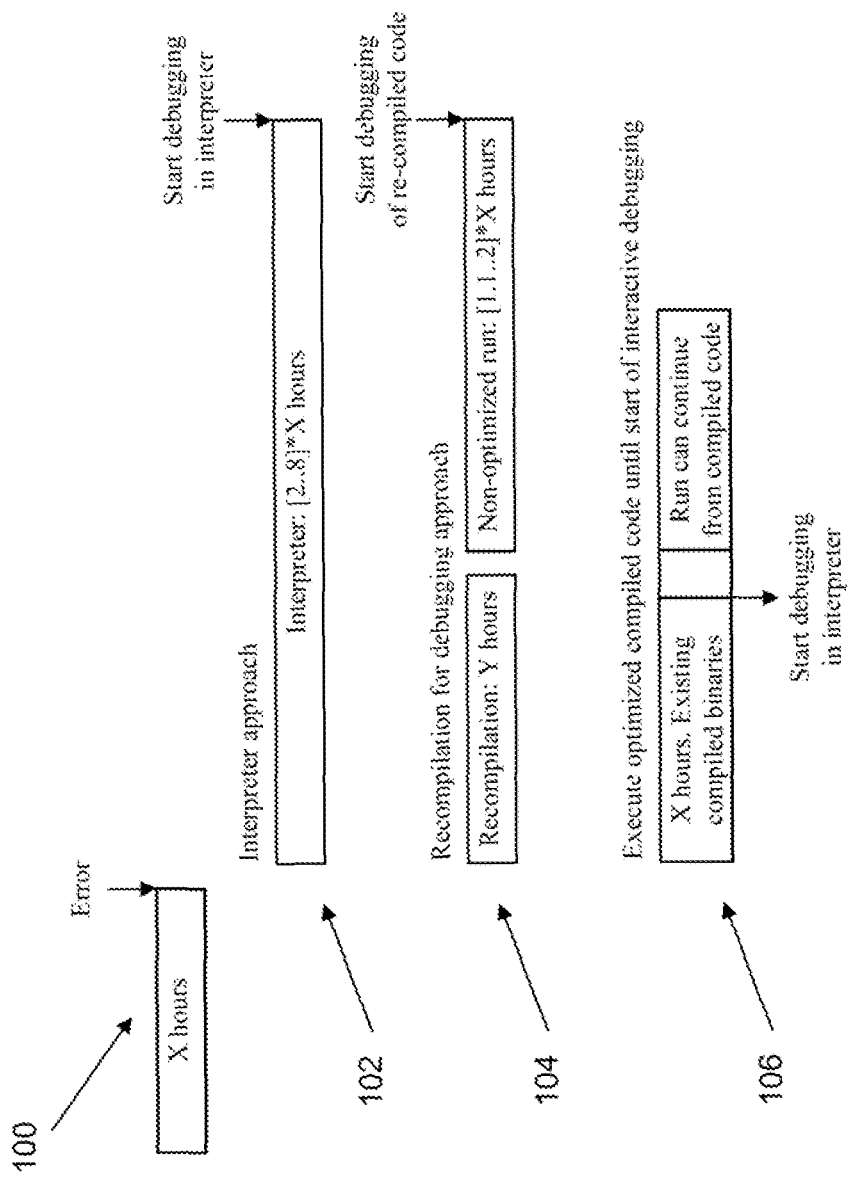
FIG. 1 illustrates advantages associated with embodiments of the invention.

FIG. 1 illustrates the benefits of using this approach as compared with the conventional recompilation and interpreter approaches. Section 100 represents the X number of hours that an optimized compiled executable would potentially run before an error occurs.

Section 102 represents the conventional interpreter approach to debugging, in which an interpreter is used without recompilation to debug the error. Even though this approach allows the software to be re-executed almost immediately without waiting for recompilation, the problem is that interpreted execution is much slower than compiled execution. This means that the interpreted execution will take much longer than X number of hours to reach the same point at which the error had occurred, before debugging can even begin. In addition, even though only a small portion of the code may contain an error that needs to be debugged, this approach requires the entire software to be run using the slow interpreter execution. The multiplier "[2 . . . 8]" represents the increased time needed to execute interpreted code as compared to the compiled code.

Section 104 represents the conventional recompilation approach for debugging, in which the software code is recompiled with debug information but without compiler optimizations. This approach requires the expense of an additional Y number of hours to perform the recompilation. Moreover, this approach results in a non-optimized executable that will take longer than X number of hours to execute to reach the point of the error, at which debugging can occur to address the originally identified error. The multiplier "[1.1 . . . 2]" represents the increased time needed to execute the un-optimized re-compiled code as compared to the optimized compiled code.

Section 106 represents execution of existing code with interactive debugging according to embodiments of the invention. In this approach, the existing compiled code with optimizations can be executed up to the point of the error, taking the same X number of hours as the original executable. When the point of the error is reached, however, the present embodiment switches to an interpretive mode to perform the interactive debugging. Once the debugging has finished, execution can resume for the compiled version of the code.

Therefore, the invention provides the best advantages of both the re-compilation and interpreted approaches without the drawbacks, where execution of the non-erroneous portions of the code can occur using the much faster optimized and compiled versions of the software. The debugging run can begin without taking the time and expense of performing a re-compilation. Instead, only upon the point of the error will debugging occur using an interactive interpretive mode. Once the point of error has passed, execution can resume using the optimized compiled version of the software.

Figure 2:
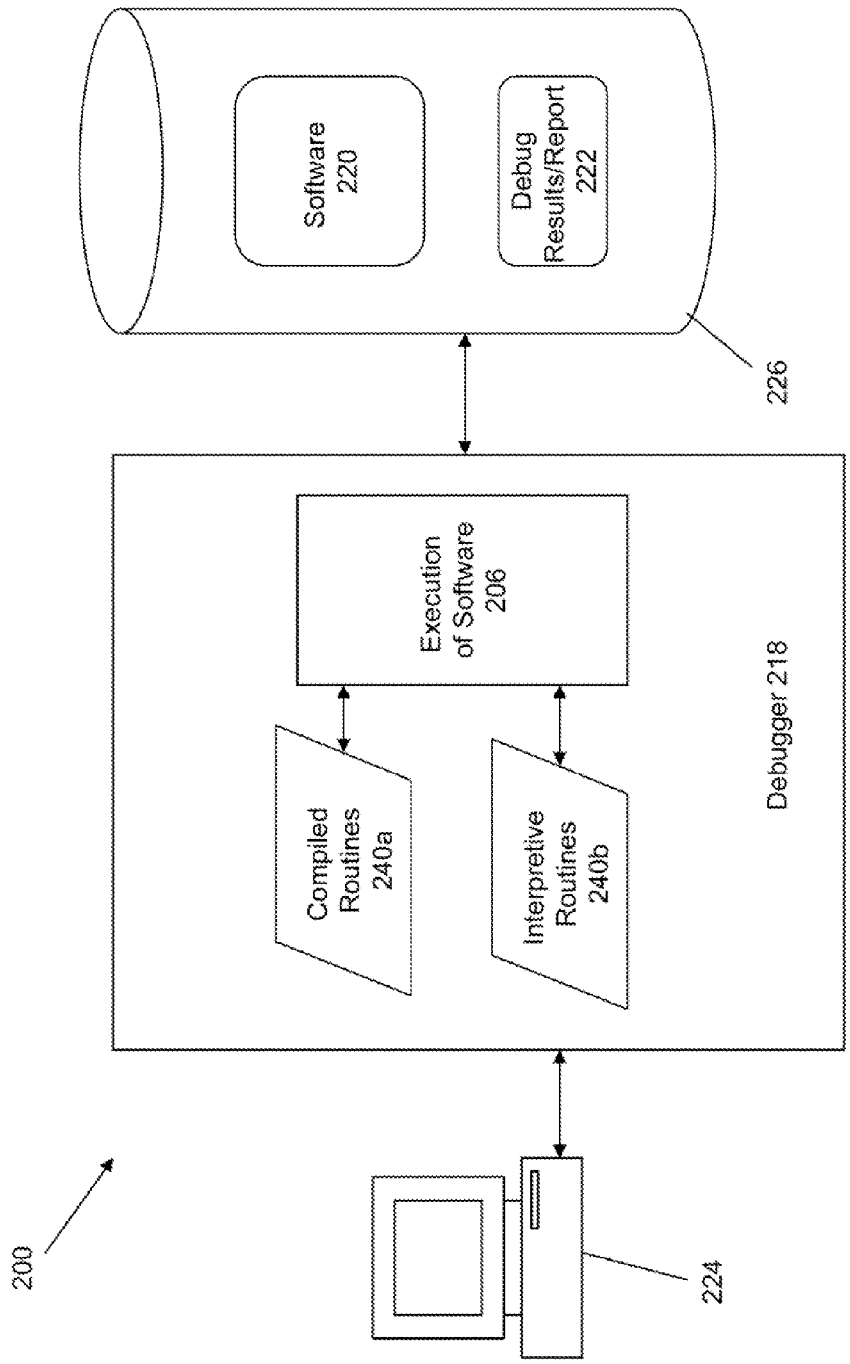
FIG. 2 illustrates an example system which may be employed in some embodiments of the invention.

FIG. 2 illustrates an example system 200 which may be employed in some embodiments of the invention to performing debugging of software using both compiled and interpreted executions. System 200 may include one or more users at one or more user stations 224 that operate the system 200 to debug software 220. Such users include, for example, programmers or verification engineers. User station 224 comprises any type of computing station that may be used to operate, interface with, or implement debugging applications or devices. Examples of such user stations 224 include for example, workstations, personal computers, or remote computing terminals. User station 224 comprises a display device, such as a display monitor, for displaying processing results 222 to users at the user station 224. User station 224 also comprises input devices for user to provide operational control over the activities of system 200.

The software 220 may be stored in a computer readable storage device 226. Computer readable storage device 226 comprises any combination of hardware and software that allows for ready access to the data that is located at the computer readable storage device 226. For example, computer readable storage device 226 could be implemented as computer memory operatively managed by an operating system. The computer readable storage device 226 could also be implemented as a storage system having storage on persistent and/or non-persistent storage. According to the present embodiment, the software 220 and debug results/reports 222 are placed into the computer readable storage device 226.

A debugger 218 may be used by users a user at user station 224 to debug software 220. The debugger 218 is utilized to perform an execution 206 of the software 220 using both compiled routine 240a and interpretive routines 240b. The compiled version of the software 220 is executed for the non-error portions of the execution run. However, at the points of error, the interpretive routines are executed to allow interactive debugging of the software 220.

According to some embodiments, the debugger 218 is enhanced with an ability to change the way method dispatching is performed. In this way, instead of calling the compiled routines 240a at a point of an error, the interpretive routines 240b will be used instead when the method is called. As the debugger 218 steps in a method, a breakpoint or a watch is inserted to initial the interpreted implementation of the method. This provides maximal visibility for the debugging functionality. As the debugger 218 leaves the method and breakpoints/watches are deleted, the compiled routine 240a can be used once again.

This inventive approach is quite different from an approach of hot-swapping two models (simulation and hardware) that exchange state information between them for debugging. In contrast, the present embodiment maintains a single model (a memory image with state information) and switches by calling either the compiled method or an interpreted one, or both accessing the same state information, intermixing execution of compiled and interpreted methods. This approach is also different from the technique often referred to as "Just In Time Compilation" (JIT), which starts with interpreted execution and over time compiles frequently visited code and substitutes. This is done for speed, and is only available for dynamic languages using byte-codes (such as Java™, Smalltalk, C#). In contrast the present invention (1) does not require a dynamic language (2) compiles off-line (3) does this for ease of debug, not performance.

Figure 3:
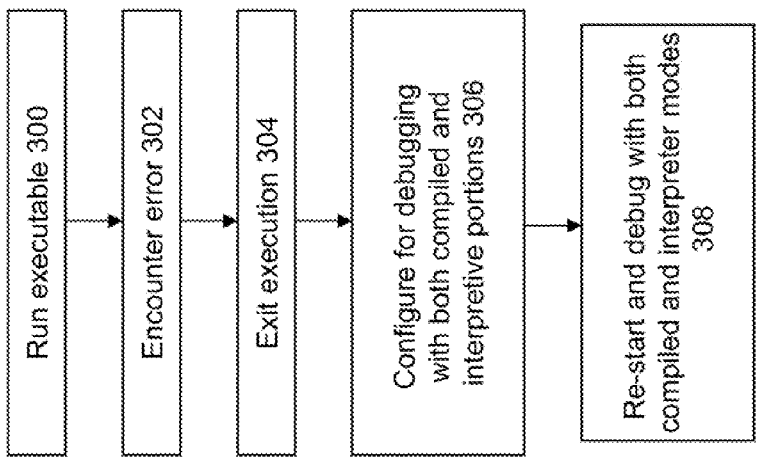
FIG. 3 shows a high level flow of a process for debugging using both compiled and interpreted modes.

FIG. 3 shows a high-level flowchart of a process for debugging errors in software code by performing on-the-fly switching from compiled to interpretive debugging. At 300, the software that is under development is executed. At this point, the execution run is based on an optimized compiled executable that has been generated for the software. An error may be encountered, at 302, during the execution of the compiled executable. As a result, at 304, the current run will exit from the execution.

At 306, configuration is performed so that the system can perform debugging using both compiled and interpretive portions. This configuration is performed to make sure that at the appropriate points in the execution of the software, the debugging process will correctly switch from one execution mode to the other.

At 308, debugging is performed by re-starting the execution using the compiled executable version of the software. However, upon reaching the point of the error, the interpretive version of the software is used to perform interactive debugging.

Figure 4A:
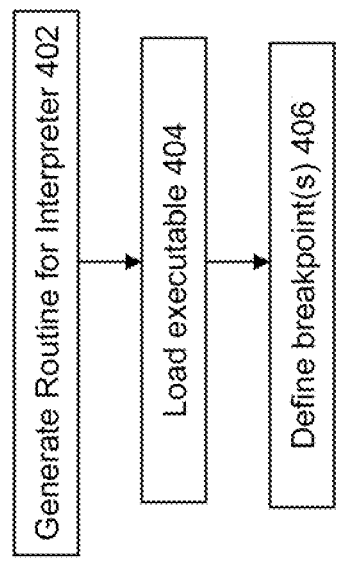
FIG. 4A shows a flow of a process for configuring a system to allow debugging using both compiled and interpreted modes.

FIG. 4A shows a flowchart of a process for configuring the system to perform debugging using both compiled and interpretive portions. At 402, routines are generated that can be executed by an interpreter for the portions of the software that need to be debugged. According to some embodiments, this action is performed by parsing the source code of the software to generate a syntax tree. The syntax tree is examined to identify the relevant parts that are needed by an interpreter for debugging purposes. For example, the syntax tree can be examined to identify certain portions that need to be replaced or modified with debug-related information that will be needed by the interpreter during the debugging phase.

At 404, the compiled executable is loaded back into the system. In the present embodiment, it is the original, optimized, and compiled executable that is loaded at this point. This re-loading occurs for two reasons. First, the original executable is re-loaded so that an execution run can be started for debugging purposes. It is noted that since the original executable is being loaded, this means that re-compilation is not needed.

Second, the re-loading occurs so that, at 406, breakpoints can be established for the execution run. The breakpoints identify the points in execution at which a switch will occur from execution of the compiled executable to the interpreted version of the software. Therefore, the breakpoint should be defined before the point at which the error was encountered.

FIG. 4B shows a flowchart of a process to perform debugging using both compiled and interpretive executable versions of the software. At 412, the compiled executable that was previously loaded is run to begin execution. This means that the original compiled version of the software will now execute.

On a "break" (i.e., the breakpoint that is reached at the point of the error), the execution of the software is switched at 414 from the compiled version of the software to the interpreted version of the software. For object oriented languages such as Java™, C++, or 'e', a dispatch table can be modified to accomplish this action. When a method is called on object pointer, an address of a routine (routine pointer), which implements this method, is fetched from dispatch table. In an alternative approach, the debugger can implement the dispatch switching by changing the address globally inside loaded executables and libraries to the address of the interpreted version.

At 416, interactive debugging is performed. The interpreter is used to execute the interpreted version of the code portions corresponding to the error. Any suitable debugging activities may be performed at this stage.

On "continue" (i.e., after the point of the error), the execution is switched back to the compiled executable version of the software. If the dispatch table was modified to implement 414, then the original dispatch table entries are restored at this point. If hardcoded addresses was modified at 414, then that address is restored at this point.

The run is continued at 420 to proceed through the rest of the software execution. The above process is repeated upon encountering any additional breakpoints for previously identified errors that need to be debugged. Once the execution is finished, the process at 422 will exit.

To illustrate embodiments of the invention, reference will now be made to the example code portions shown in FIG. 5A. These code portions shows a main( ) routine having a sequence of code statements, include a code statement 502 for a function call "a.f_i( )". Assume that during an earlier execution of the program, an error occurred with regard to this function call. The software code shown of FIG. 5A also shows the class definition for class "A" with portion 504 relating to the method definition corresponding to the error that was encountered.

Figure 5B:
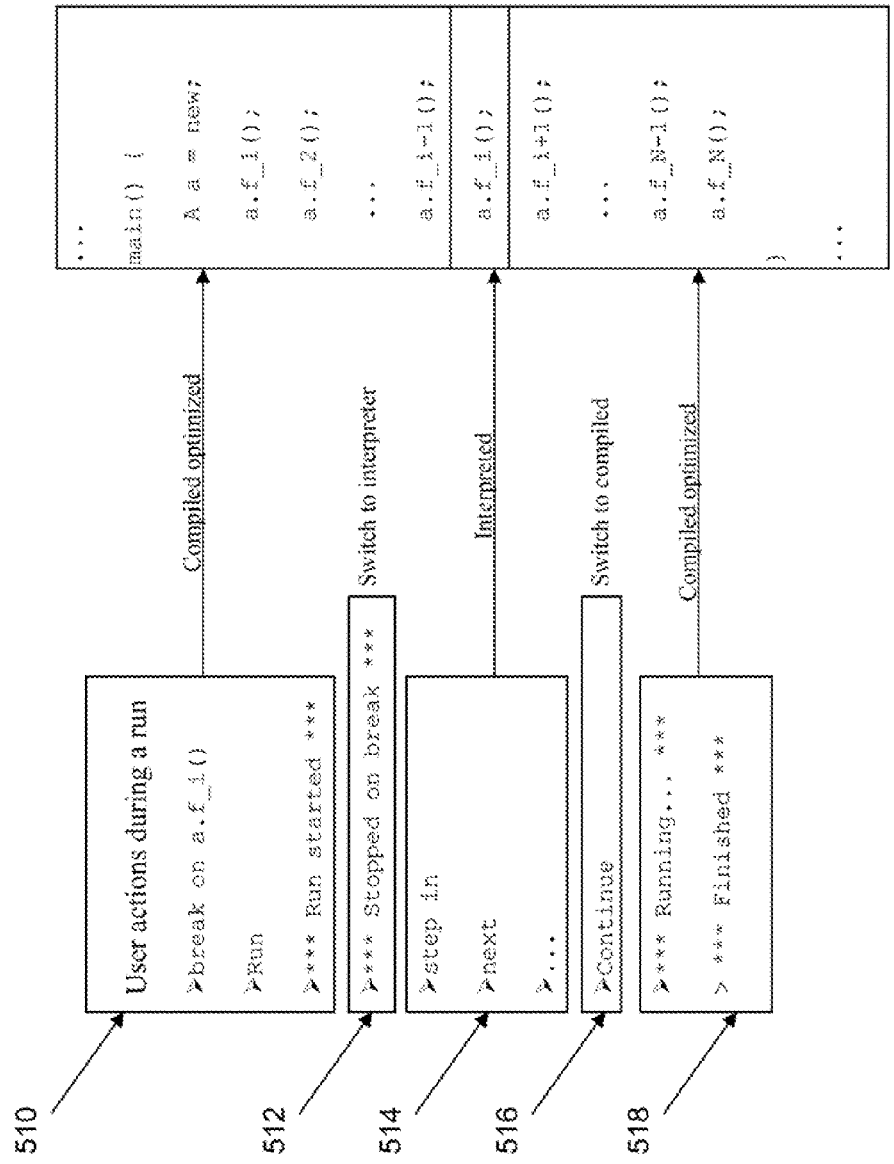

FIG. 5B illustrates how embodiments of the invention can be utilized to perform debugging using both compiled and interpretive executable versions of the software. The left side of this figure shows user actions that are taken during a run, and the right side of the figure shows the portions of the software code as they are being executed.

At portion 510, breakpoint is established for the portion of the program that corresponds to the identified error. In particular, the breakpoint is established at the entry of the "a.f_i( )" statement in the software program, which was previously identified as corresponding to the error. It is noted that any suitable breakpoint syntax or mechanism may be employed within the scope of the invention, and the specific syntax shown here is for illustrative purposes only. The run is then started. Execution begins with the compiled optimized executable for the software. Each statement in the program is then executed using the compiled version of the software, up until the point of the breakpoint is reached.

At that point, at 512, the run is stopped on the break, at "step in". The system at 514 changes to execution using the interpreted version of the software. Debugging can then proceed interactively using the interpreter.

Once execution reaches past the location of the error, on the "continue" at 516, a switch is made back to the compiled optimized executable. At 518, execution resumes with the compiled optimized executable version of the software. The execution run then continues until it is finished (unless there are any further breakpoints that need to be addressed).

As noted above, there are several approaches that can be taken to perform a switch between execution of compiled executable and interpreted executables. For example, for object oriented languages, methods are dispatched according to a virtual method table, or dispatch table, which is a data structure that bounds methods to an object instance in runtime. When a method is called on object pointer, an address of a routine (routine pointer), which implements this method, is fetched from dispatch table. If an address of a compiled routine is changed to an address of an interpreted routine, the latter will be used when this method is called for relevant object. Of course, interpreter must share the runtime environment with compiled code, including type system, memory management, etc.

Figure 6:
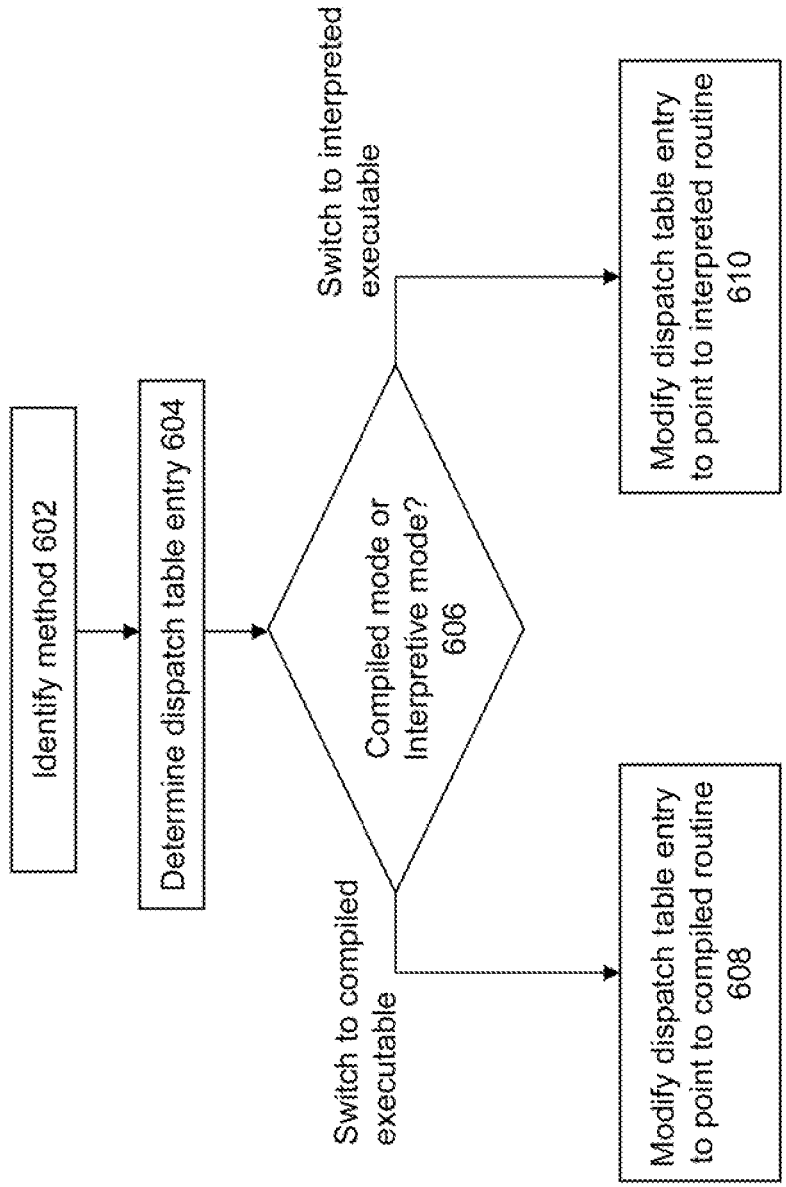
FIG. 6 shows a flow of a process for modifying a dispatch table to switch between compiled and interpreted modes.

FIG. 6 shows a flowchart of a process for performing this type of execution switching. At 602, the method for which a switch is required is identified. The identified method should correspond to the portion of the software at which an error was identified and for which debugging is needed.

At 604, a determination is made of the entry in the dispatch table that corresponds to the identified method. This entry in the dispatch table contains the pointer for the routines that will be executed upon a call of the method. Therefore, the pointer can be modified to point to the address of the interpreted routine if it is desired to switch to interpreted execution. The pointer can be modified to point to the address of the compiled routine if it is desired to switch to compiled execution. At 606, a determination is made whether the switch is from compiled execution to interpreted execution, or vice versa.

If the desired switch is upon encountering the breakpoint, then the switch is from the compiled execution to the interpreted execution. Therefore, at 610, the dispatch table entry is modified such that the address value points to the interpreted version of the executable routine.

If the desired switch is upon a "continue" after debugging has already occurred, then the switch is from the interpreted execution to the compiled execution. Therefore, at 608, the dispatch table entry is modified such that the address value points to the compiled version of the executable routine.

Figure 7:
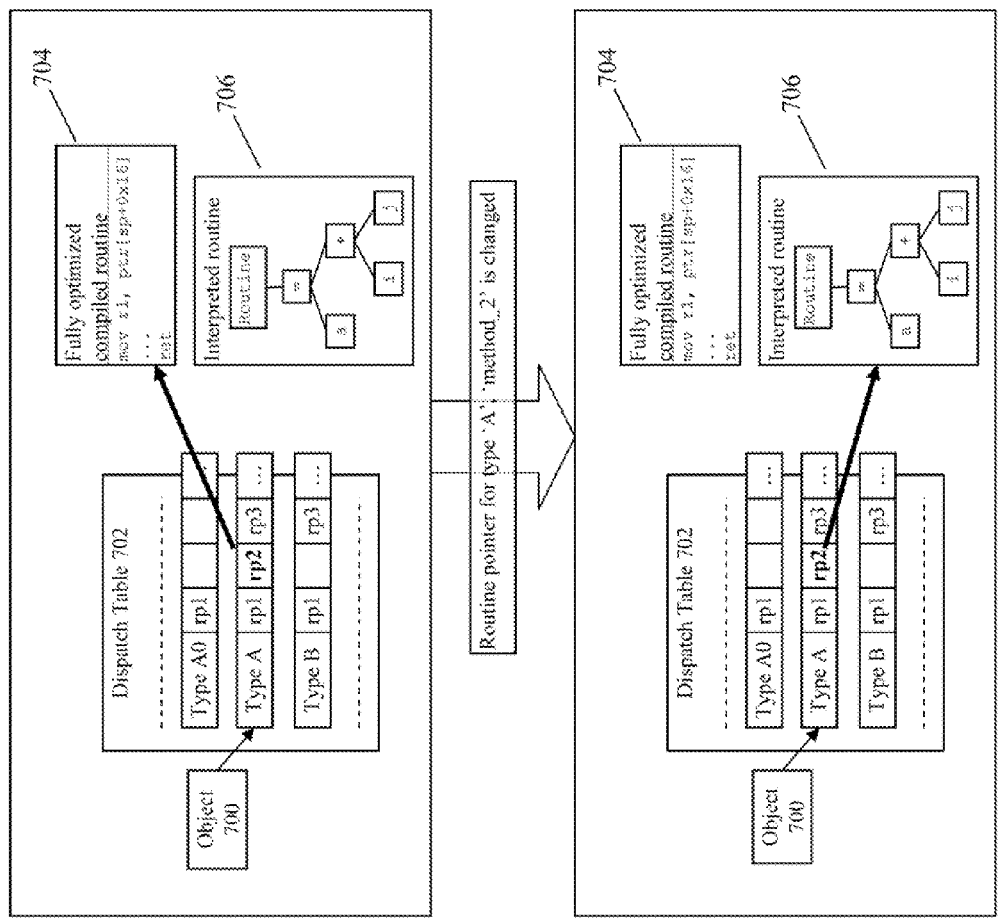
FIG. 7 provides an illustrative example for modifying a dispatch table entry to switch between compiled and interpreted modes.

FIG. 7 provides an illustrative example of this approach to switching between different executions modes. This figure illustrates a dispatch table 702 which includes entries for an object 700 corresponding to a method ('objectA.method_ 2( );') for which a switch is desired, e.g., because an error was encountered for this object/method. Two types of routines have been configured for this method. Routine 704 corresponds to the fully optimized compiled routine for this method. Routine 706 corresponds to the interpreted routine for this method.

The top portion of the figure shows the situation when the dispatch table entry includes a pointer to the routine 704 corresponding to the fully optimized compiled routine for this method. Here, the pointer "rp2" is configured to include the address for routine 704. This situation corresponds to the scenario when the run has just started and the point of the error has not yet been reached. This situation also corresponds to the scenario after debugging has already occurred and the run is intended to execute with the compiled version of the executable.

The bottom portion of the figure shows the situation when the dispatch table entry is modified to include a pointer to the routine 706 corresponding to the interpreted routine for the method. Here, the pointer "rp2" is modified to include the address for routine 706. This situation corresponds to the scenario when the breakpoint has been encountered, and it is desired to execute in interpreted mode to perform interactive debugging.

Therefore, the routine pointer can be configured so that the desired implementation will be dispatched. If a switch from compiled implementation to interpreted implementation is desired, then the routine pointer is changed to include the address for the interpreted routine. If a switch from interpreted implementation to compiled implementation is desired, then the routine pointer is changed to include the address for the compiled routine.

In the case that the method or function is bound during compilation (as functions in C or non-virtual methods in C++) and is called using its address, and 'hardwired' in machine code, the debugger can still switch the dispatching by changing the address globally inside loaded executable and libraries to the address of the interpreted version. In other words, the method call in machine language can be configured to include the correct address pointer for the desired routine.

Instead of patching the whole executable, hardware or software breakpoint mechanism may be used: stop in machine code debugger when compiled routine is called and jump to execute the interpreted routine.

An interpreter for languages like C++, 'e', or C should be able to execute only some intermediate format (like AST), not source code directly line by line. It is preferred, but not necessary, to parse source code into such format before a debug run and save in a file to be loaded on start of debugging.

Therefore, what has been described is an improved method, system, mechanism, and program product for performing debugging.

System Architecture Overview

Figure 8:
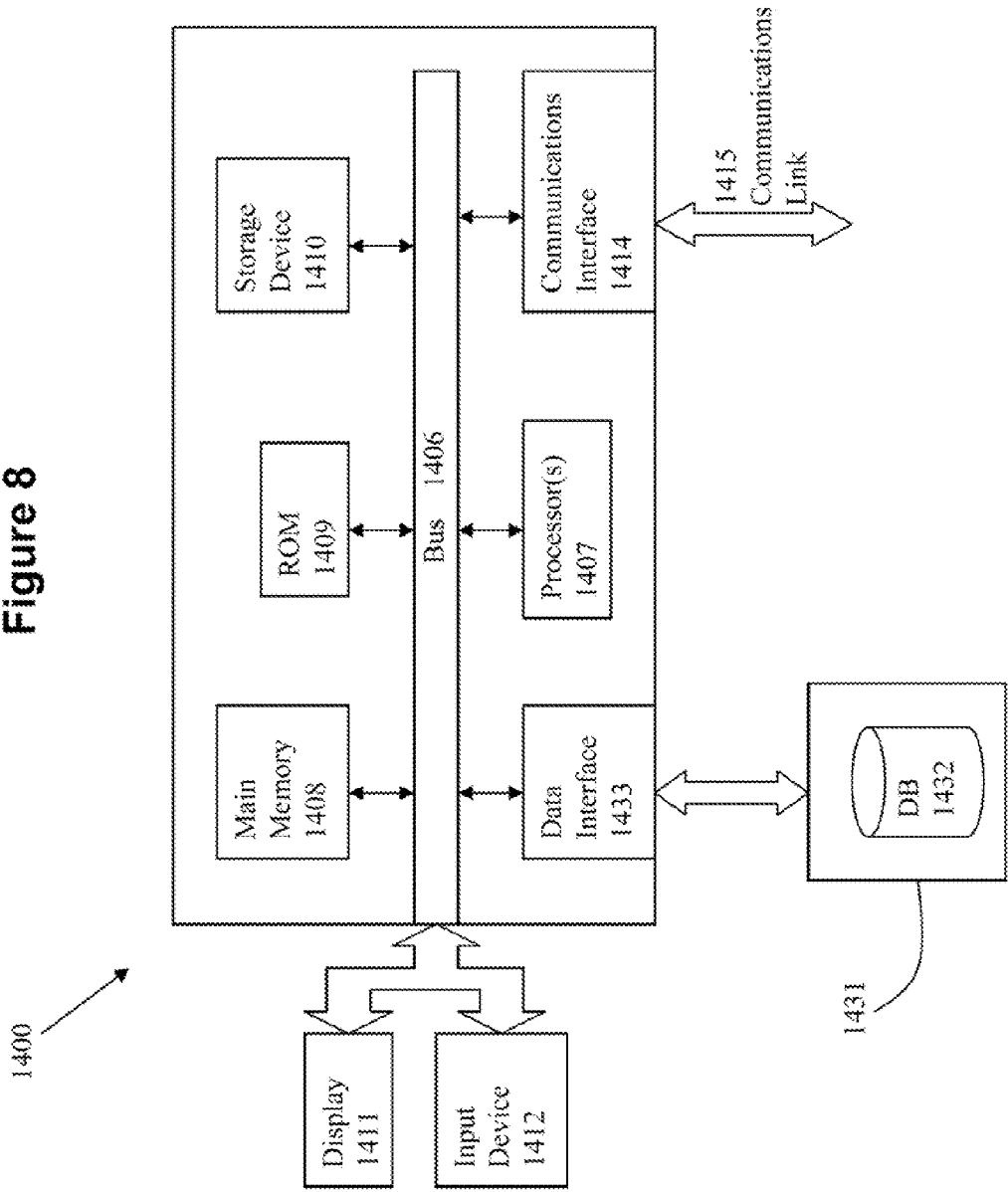
FIG. 8 depicts a computerized system on which a method for re-using digital assertions in a mixed signal context can be implemented.

FIG. 8 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., random access memory (RAM)), static storage device 1409 (e.g., read-only memory (ROM)), disk drive 1410 (e.g., magnetic or optical), communication interface 1414 (e.g., modem or Ethernet card), display 1411 (e.g., cathode ray tube (CRT) or liquid crystal display (LCD)), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, programmable read only memory (PROM), erasable programmable read only memory (EPROM), FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., local area network (LAN), public telephone switched network (PTSN), or wireless network) may perform the sequence of instructions required to practice the invention in coordination with one another.

Computer system 1400 may transmit and receive messages, data, and instructions, including program, e.g., application code, through communication link 1415 and communication interface 1414. Received program code may be executed by processor 1407 as it is received, and/or stored in disk drive 1410, or other non-volatile storage for later execution. Computer system 1400 may communicate through a data interface 1433 to a database 1432 on an external storage device 1431.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method implemented with a processor for debugging software, comprising:
    identifying software code that needs to be debugged;
    performing a configuration so that any portion of the software code is capable of executing with a compiled version or an interpreted version; and
    running the software by executing a first portion of the software using the compiled version and executing a second portion of the software using the interpreted version, wherein debugging occurs during execution of the second portion using the interpreted version and not during execution of the first portion using the compiled version;
    wherein an address is changed between the compiled version and the interpreted version to perform a switch in execution between these versions, by using assembly language to change the address in an executable or library.

2. The method of claim 1 in which the configuration comprises setting a breakpoint to switch execution between the compiled version and the interpreted version.

3. The method of claim 1 in which the configuration comprises the action of generating the interpreted version.

4. The method of claim 3 in which the interpreted version is created by parsing source code for the software to generate a syntax tree, and examining the syntax tree to create one or more interpreted routines.

5. The method of claim 1 in which the compiled version is executed without requiring recompilation of the software after detection of the error.

6. The method of claim 1 in which a dispatch table entry corresponding to a method is modified to change the address.

7. The method of claim 1 in which the interpreted version utilizes an intermediate format for execution.

8. A system for debugging software, comprising:
    a processor;
    a memory for holding programmable code; and
    wherein the programmable code includes instructions for identifying software code that needs to be debugged, performing a configuration so that any portion of the software code is capable of executing with a compiled version or an interpreted version, and running the software by executing a first portion of the software using the compiled version and executing a second portion of the software using the interpreted version, wherein debugging occurs during execution of the second portion using the interpreted version and not during execution of the first portion using the compiled version, wherein an address is changed between the compiled version and the interpreted version to perform a switch in execution between these versions, by using assembly language to change the address in an executable or library.

9. The system of claim 8 in which the configuration comprises a breakpoint set to switch execution between the compiled version and the interpreted version.

10. The system of claim 8 in which the instructions for performing the configuration comprises generating the interpreted version.

11. The system of claim 10 in which the interpreted version is created by parsing source code for the software to generate a syntax tree, and examining the syntax tree to create one or more interpreted routines.

12. The system of claim 8 in which the compiled version is executed without requiring recompilation of the software after detection of the error.

13. The system of claim 8 in which a dispatch table entry corresponding to a method is modified to change the address.

14. The system of claim 8 in which the interpreted version utilizes an intermediate format for execution.

15. A computer program product embodied on a non-transitory computer usable medium, the non-transitory computer usable medium having stored thereon a sequence of instructions which, when executed by a processor causes the processor to execute a method for debugging software, the method comprising:
    identifying software code that needs to be debugged;
    performing a configuration so that any portion of the software code is capable of executing with a compiled version or an interpreted version; and
    running the software by executing a first portion of the software using the compiled version and executing a second portion of the software using the interpreted version, wherein debugging occurs during execution of the second portion using the interpreted version and not during execution of the first portion using the compiled version;
    wherein an address is changed between the compiled version and the interpreted version to perform a switch in execution between these versions, by using assembly language to change the address in an executable or library.

16. The computer program product of claim 15 in which the configuration comprises setting a breakpoint to switch execution between the compiled version and the interpreted version.

17. The computer program product of claim 15 in which the configuration comprises the action of generating the interpreted version.

18. The computer program product of claim 17 in which the interpreted version is created by parsing source code for the software to generate a syntax tree, and examining the syntax tree to create one or more interpreted routines.

19. The computer program product of claim 15 in which the compiled version is executed without requiring recompilation of the software after detection of the error.

20. The computer program product of claim 15 in which a dispatch table entry corresponding to a method is modified to change the address.

21. The computer program product of claim 15 in which the interpreted version utilizes an intermediate format for execution.

* * * * *